US012597727B2

(12) United States Patent
Kanematsu et al.

(10) Patent No.: US 12,597,727 B2
(45) Date of Patent: Apr. 7, 2026

(54) ELECTRICAL CONNECTOR WITH DEVICE-SIDE TERMINAL PORTION CONNECTED TO CONNECTOR-SIDE TERMINAL PORTION

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Yuta Kanematsu, Mie (JP); Junichi Mukuno, Mie (JP); Sunghyun Byun, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 280 days.

(21) Appl. No.: 18/281,934

(22) PCT Filed: Mar. 8, 2022

(86) PCT No.: PCT/JP2022/009874
§ 371 (c)(1),
(2) Date: Sep. 13, 2023

(87) PCT Pub. No.: WO2022/196423
PCT Pub. Date: Sep. 22, 2022

(65) Prior Publication Data

US 2024/0170877 A1 May 23, 2024

(30) Foreign Application Priority Data

Mar. 17, 2021 (JP) ................................ 2021-043144

(51) Int. Cl.
*H01R 13/405* (2006.01)
*H01R 4/34* (2006.01)
(Continued)

(52) U.S. Cl.
CPC ............. *H01R 13/405* (2013.01); *H01R 4/34* (2013.01); *H01R 13/506* (2013.01); *H01R 13/52* (2013.01);
(Continued)

(58) Field of Classification Search
CPC ...... H01R 13/405; H01R 4/34; H01R 13/506; H01R 13/52; H01R 13/5202;
(Continued)

(56) References Cited

U.S. PATENT DOCUMENTS

2009/0029594 A1 1/2009 Matsuoka
2012/0094537 A1* 4/2012 Aoki .................... H01R 13/688 439/620.26
(Continued)

FOREIGN PATENT DOCUMENTS

JP H10-189147 A 7/1998
JP 2004273381 A * 9/2004
JP 2016-192287 A 11/2016

OTHER PUBLICATIONS

International Search Report issued on May 31, 2022 for WO 2022/196423 A1 (4 pages).

*Primary Examiner* — Justin M Kratt
(74) *Attorney, Agent, or Firm* — Venjuris, P.C.

(57) ABSTRACT

A connector to be connected to a device-side terminal portion provided in a device is provided with a connector-side terminal portion connected to an end of a wire, and a housing for accommodating the connector-side terminal portion. The housing includes a fastening member accommodating portion for accommodating one of a pair of
(Continued)

fastening members for fastening the connector-side terminal portion and the device-side terminal portion, a terminal holding portion for holding the connector-side terminal portion overlapped on the fastening member accommodating portion in a first direction, a terminal inserting portion facing the terminal holding portion, the device-side terminal portion being inserted through the terminal inserting portion to be overlapped on the connector-side terminal portion in the first direction, an opening window arranged to face the connector-side terminal portion in the first direction.

9 Claims, 11 Drawing Sheets

(51) Int. Cl.

| | |
|---|---|
| ***H01R 13/506*** | (2006.01) |
| ***H01R 13/52*** | (2006.01) |
| ***H01R 13/621*** | (2006.01) |
| ***H01R 13/6581*** | (2011.01) |
| ***H01R 13/74*** | (2006.01) |
| *H01R 4/28* | (2006.01) |
| *H01R 4/30* | (2006.01) |
| *H01R 13/40* | (2006.01) |
| *H01R 13/41* | (2006.01) |
| *H01R 13/42* | (2006.01) |
| *H01R 13/424* | (2006.01) |
| *H01R 13/502* | (2006.01) |
| *H01R 13/512* | (2006.01) |

(52) U.S. Cl.

CPC ....... *H01R 13/5202* (2013.01); *H01R 13/621* (2013.01); *H01R 13/6581* (2013.01); *H01R 13/748* (2013.01); *H01R 4/28* (2013.01); *H01R 4/30* (2013.01); *H01R 13/40* (2013.01); *H01R 13/41* (2013.01); *H01R 13/42* (2013.01); *H01R 13/424* (2013.01); *H01R 13/502* (2013.01); *H01R 13/512* (2013.01); *H01R 13/6215* (2013.01)

(58) Field of Classification Search

CPC .............. H01R 13/621; H01R 13/6581; H01R 13/748; H01R 4/28; H01R 4/30; H01R 13/40; H01R 13/41; H01R 13/42; H01R 13/424; H01R 13/502; H01R 13/512; H01R 13/6215

See application file for complete search history.

(56) References Cited

U.S. PATENT DOCUMENTS

| | | | |
|---|---|---|---|
| 2012/0238147 | A1 | 9/2012 | Matsumoto et al. |
| 2014/0004740 | A1 | 1/2014 | Uno et al. |
| 2014/0113489 | A1 | 4/2014 | Tanaka et al. |

* cited by examiner

ELECTRICAL CONNECTOR WITH DEVICE-SIDE TERMINAL PORTION CONNECTED TO CONNECTOR-SIDE TERMINAL PORTION

CROSS REFERENCE TO RELATED APPLICATIONS

This application is a national phase of PCT application No. PCT/JP2022/009874, filed on 8 Mar. 2022, which claims priority from Japanese patent application No. 2021-043144, filed on 17 Mar. 2021, all of which are incorporated herein by reference.

TECHNICAL FIELD

The present disclosure relates to a connector.

BACKGROUND

Patent Document 1 discloses a connector in which a wire is connected to a device-side terminal portion provided in a device for wiring. This connector is provided with a connector body to be mounted into a connector mounting portion provided on the device. The connector mounting portion provided on the device includes a terminal block for holding the device-side terminal portion, and wiring on the device side is connected to the device-side terminal portion. The connector body includes a housing and a connector-side terminal portion connected to an end of a wire accommodated in the housing. In mounting the connector body on the mounting portion, the device-side terminal portion held in the terminal block and the connector-side terminal portion accommodated in the connector body are fastened to each other by a fastening member built in the terminal block of the connector mounting portion.

PRIOR ART DOCUMENT

Patent Document

Patent Document 1: JP 2013-026078 A

SUMMARY OF THE INVENTION

Problems to be Solved

However, in the connector shown in Patent Document 1, the connector mounting portion of the device needs to have a special structure and the structure of the device side may be complicated. Further, the fastening member for fastening the device-side terminal portion and the connector-side terminal portion is built in the connector mounting portion and a problem of causing the enlargement and higher cost of the device has been inherent.

Accordingly, a connector is disclosed which enables the simplification of the structure of a device side and a size reduction of a device.

Means to Solve the Problem

The present disclosure is directed to a connector to be connected to a device-side terminal portion provided in a device, the connector being provided with a connector-side terminal portion connected to an end of a wire and a housing for accommodating the connector-side terminal portion, the housing including a fastening member accommodating portion for accommodating one of a pair of fastening members for fastening the connector-side terminal portion and the device-side terminal portion, a terminal holding portion for holding the connector-side terminal portion overlapped on the fastening member accommodating portion in a first direction, a terminal inserting portion facing the terminal holding portion, the device-side terminal portion being inserted through the terminal inserting portion to be overlapped on the connector-side terminal portion in the first direction, an opening window arranged to face the connector-side terminal portion in the first direction, the connector-side terminal portion being exposed to outside and the other of the pair of fastening members being insertable through the terminal inserting portion, and a cover portion for covering the opening window.

Effect of the Invention

According to the connector of the present disclosure, it is possible to achieve the simplification of the structure of the device side and a size reduction of the device.

DETAILED DESCRIPTION TO EXECUTE THE INVENTION

<Description of Embodiments of Present Disclosure>

Figure 1:
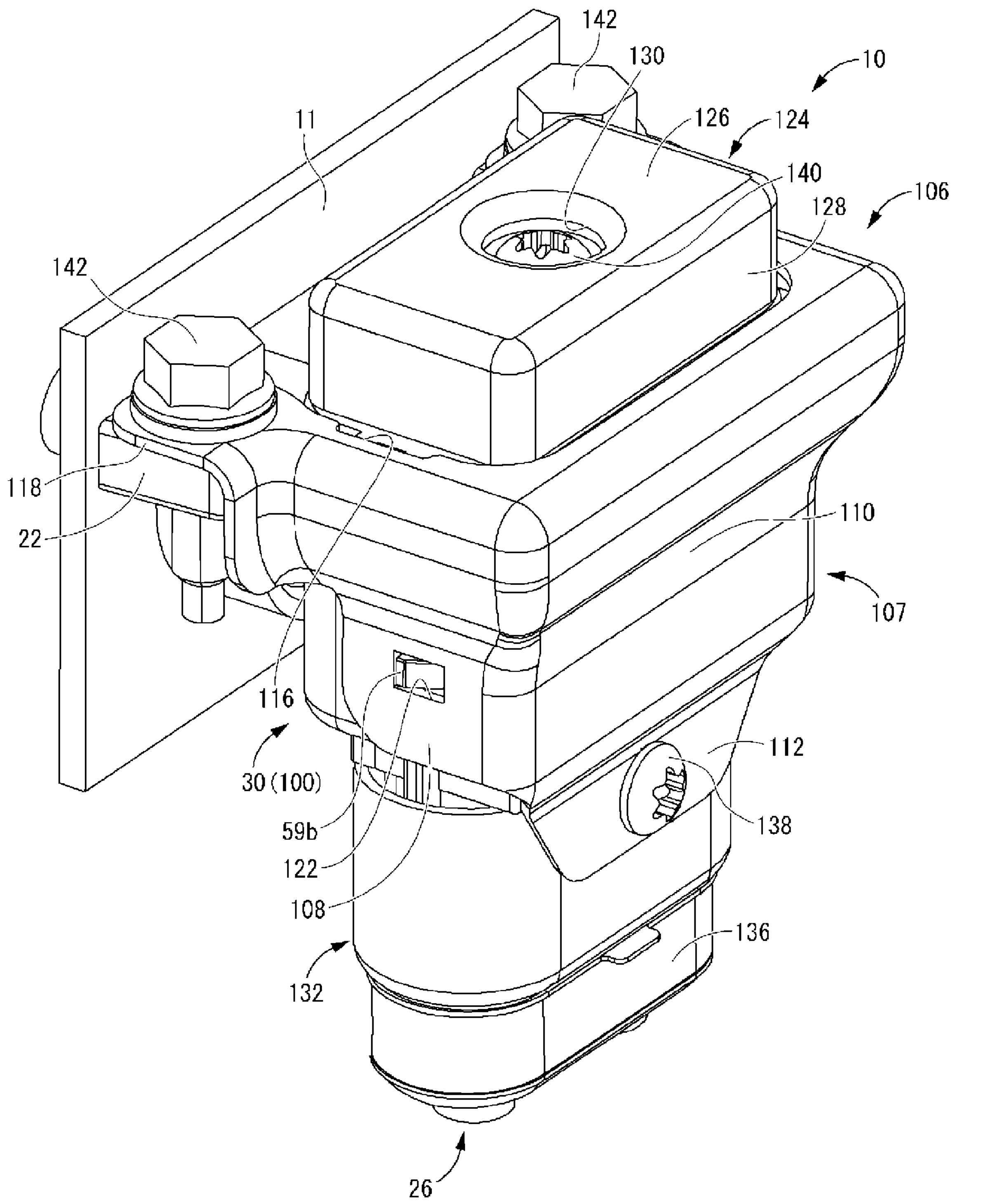
FIG. 1 is an overall perspective view of a connector according to one embodiment.
Figure 2:
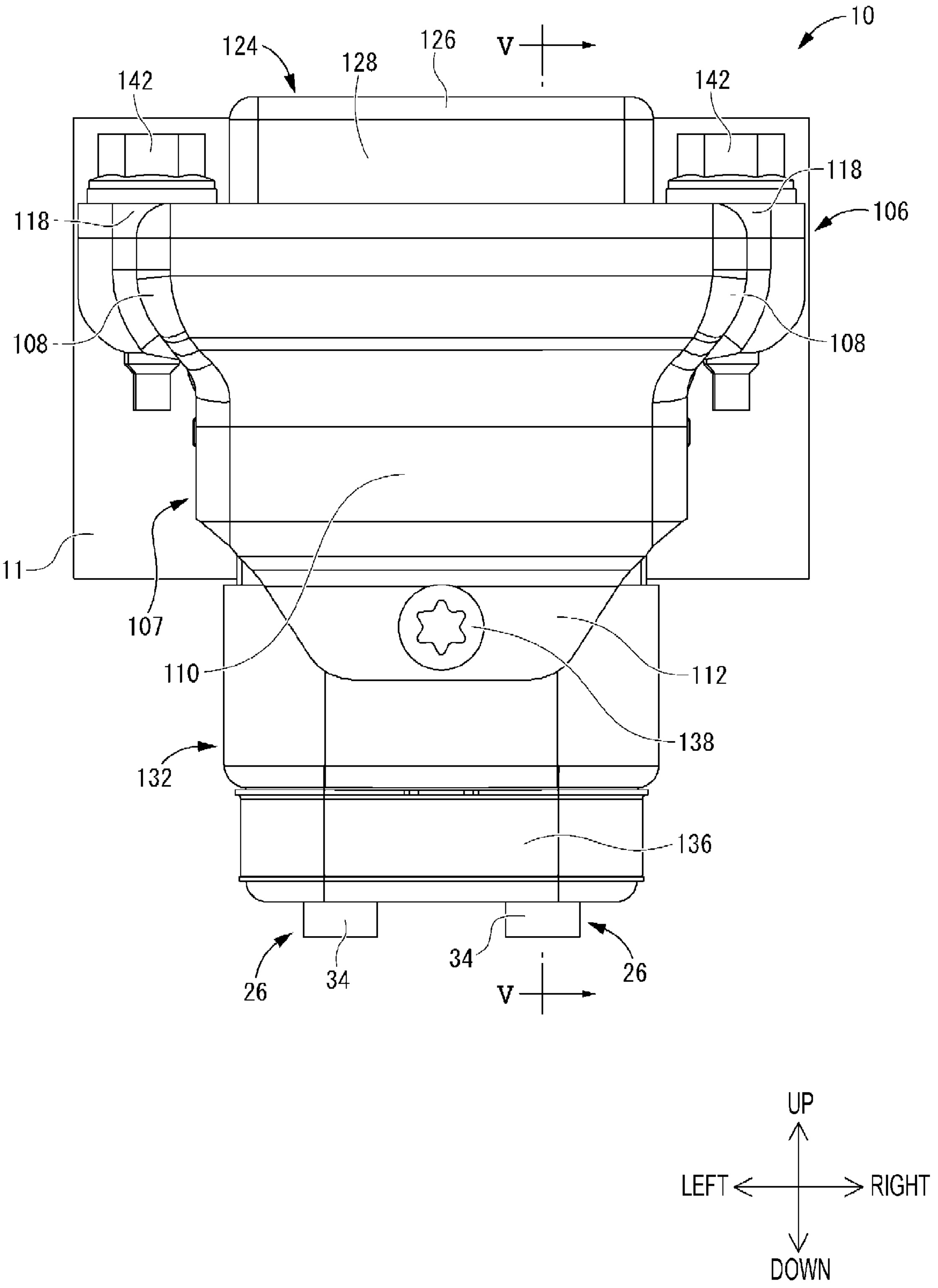
FIG. 2 is a back view of the connector shown in FIG. 1.
Figure 3:
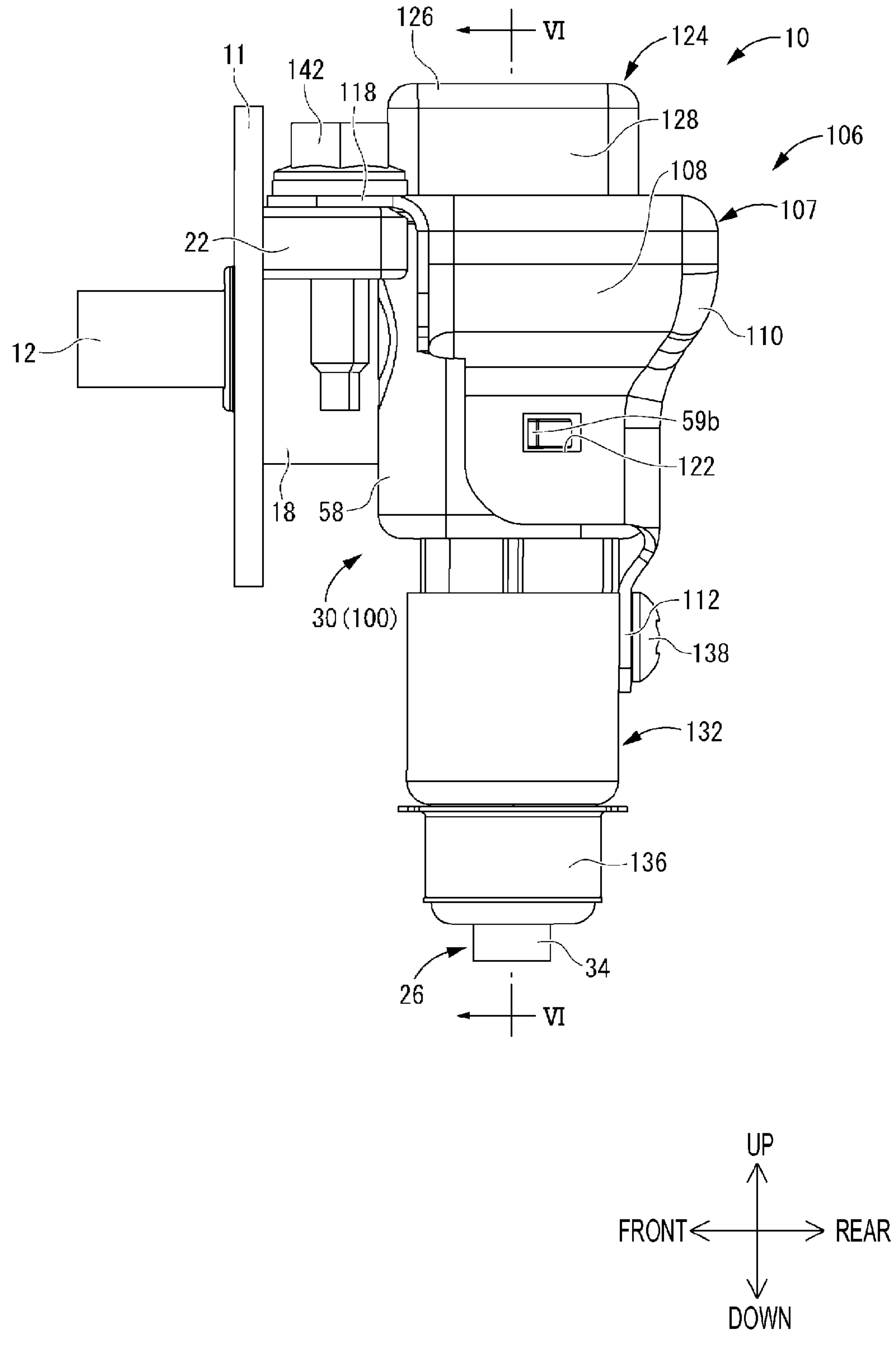
FIG. 3 is a side view of the connector shown in FIG. 1.
Figure 4:
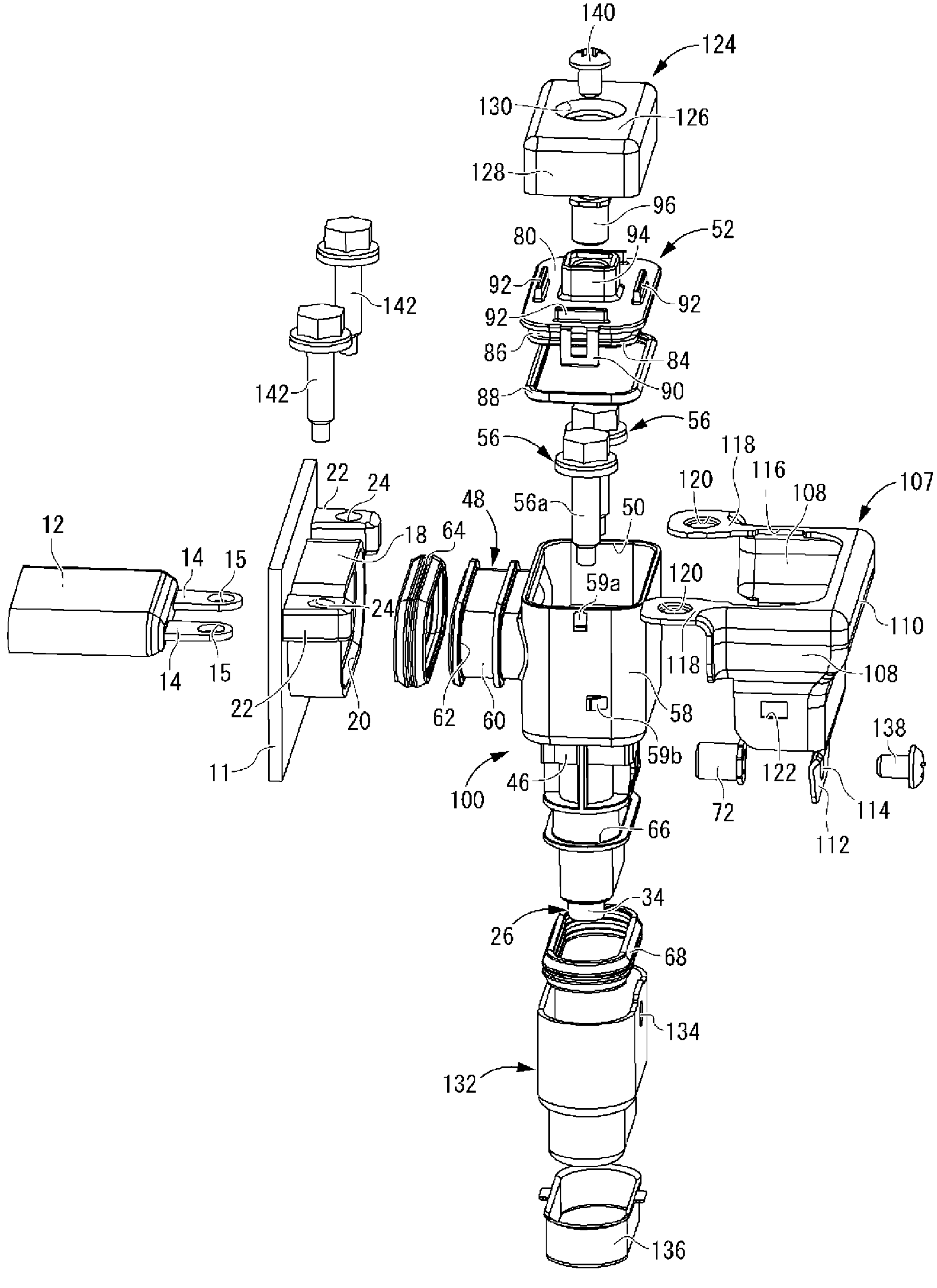
FIG. 4 is an exploded perspective view of the connector shown in FIG. 1.

First, embodiments of the present disclosure are listed and described.

(1) The connector of the present disclosure is to be connected to a device-side terminal portion provided in a device, and provided with a connector-side terminal portion connected to an end of a wire and a housing for accommodating the connector-side terminal portion, the housing including a fastening member accommodating portion for accommodating one of a pair of fastening members for fastening the connector-side terminal portion and the device-side terminal portion, a terminal holding portion for holding the connector-side terminal portion overlapped on the fastening member accommodating portion in a first direction, a terminal inserting portion facing the terminal holding portion, the device-side terminal portion being inserted through the terminal inserting portion to be overlapped on the connector-side terminal portion in the first direction, an opening window arranged to face the connector-side terminal portion in the first direction, the connector-side terminal portion being exposed to outside and the other of the pair of fastening members being insertable through the terminal inserting portion, and a cover portion for covering the opening window.

According to the connector of the present disclosure, the housing of the connector to be connected to the device-side terminal portion is provided with the fastening member accommodating portion for accommodating the one of the pair of fastening members for fastening the connector-side terminal portion and the device-side terminal portion. By inserting the device-side terminal portion through the terminal inserting portion provided on the housing, the device-side terminal portion is accommodated into the housing and can be overlapped in the first direction on the connector-side terminal portion overlapped on the fastening member accommodating portion in the first direction. Further, the opening window provided in the housing is arranged to face the connector-side terminal portion in the first direction. The opening window is of such a size that the other of the pair of fastening members to be fastened to the one of the pair of fastening members accommodated in the housing is insertable. Therefore, by assembling the other fastening member with the one fastening member through the opening window of the housing with the connector mounted on the device, the connector-side terminal portion and the device-side terminal portion can be firmly fastened. Therefore, the fastening member for fastening the connector-side terminal portion and the device-side terminal portion needs not be built in the device side, the structure of the device side can be simplified and the device can be reduced in size.

(2) Preferably, the connector-side terminal portion includes a wire connecting portion connected to the wire, an intermediate portion extending in the first direction from the wire connecting portion and a first bent portion bent in a second direction intersecting the first direction from a tip of the intermediate portion, and the first bent portion is overlapped on the fastening member accommodating portion in the first direction. The connector-side terminal portion includes the intermediate portion extending in the first direction and the first bent portion bent in the second direction intersecting the first direction from the tip of the intermediate portion, and the first bent portion is overlapped on the fastening member accommodating portion in the first direction. In this way, the fastening member accommodating portion can be space-efficiently provided in the housing, making good use of an internal region of the L-shaped connector-side terminal portion. As a result, a size reduction of the connector can also be achieved.

(3) Preferably, in (2) described above, the connector-side terminal portion includes a second bent portion located between the wire connecting portion and the intermediate portion and bent in the second direction from a base end of the intermediate portion, and the second bent portion projects from the intermediate portion toward the same side as the first bent portion and a projecting dimension of the second bent portion is smaller than that of the first bent portion. The first and second bent portions projecting toward the same side are provided on both the tip and the base end of the intermediate portion of the connector-side terminal portion, and the projecting dimension of the second bent portion is smaller than that of the first bent portion. In this way, the wire connected to the wire connecting portion and the connector-side terminal portion can be arranged concentrically or almost concentrically in projection in the first direction. As a result, a space efficient arrangement of the wire and the connector-side terminal portion can be realized in addition to a space efficient arrangement of the fastening member accommodating portion, and the connector can be further reduced in size.

(4) Preferably, the terminal inserting portion of the housing has a tubular outer surface to be inserted into a tubular mounting hole provided in the device and having the device-side terminal portion arranged therein and an annular sealing member to be sandwiched between the mounting hole and the tubular outer surface is mounted on the tubular outer surface. On the device side, it is sufficient to provide the tubular mounting hole having the device-side terminal portion arranged therein, and the configuration of the device side can be simplified. Further, sealability inside the device may be achieved by forming the outer surface of the terminal inserting portion of the housing of the connector into the tubular outer surface corresponding to the mounting hole of the device side and mounting the annular sealing member to be sandwiched between the mounting hole and the terminal inserting portion on that outer surface. Therefore, waterproofness on the device side can also be improved by a simple structure.

(5) Preferably, in (2) or (3) described above, the connector-side terminal portion is embedded in the terminal holding portion and the first bent portion is exposed on an outer surface of the terminal holding portion, and the housing includes a hollow case portion for surrounding the first bent portion exposed on the outer surface of the terminal holding portion from outside, the hollow case portion being integrated with the terminal holding portion. Since the connector-side terminal portion is held embedded in the terminal holding portion, the connector-side terminal portion is stably held by the terminal holding portion. Further, since the hollow case portion for surrounding the first bent portion exposed on the outer surface of the terminal holding portion is integrated with the terminal holding portion, water intrusion through a gap between the members is suppressed and the waterproofness of the connector can be improved as compared to the case where the terminal holding portion and the hollow case portion are separate from each other and assembled.

(6) Preferably in (5) described above, in the housing, the opening window is provided in a first surface of the hollow case portion facing the first bent portion in the first direction and the terminal inserting portion is provided on a second surface of the hollow case portion facing the first bent portion from a side opposite to the intermediate portion in the second direction. The opening window is provided in the first surface of the hollow case portion, and the terminal holding portion is provided on the second surface different from the first surface of the hollow case portion. Thus, it is possible to form the opening window relatively large so that the other of the pair of fastening members is insertable and form the terminal holding portion, through which the device-side terminal portion is inserted, relatively small By forming the large opening window, a degree of freedom in selecting the fastening member to be inserted through the opening window can be improved. Further, by forming the small terminal inserting portion, the rigidity of the terminal inserting portion can be improved and a cost reduction is possible by suppressing processing cost.

(7) Preferably, in (5) or (6) described above, the fastening member accommodating portion is arranged on the side of the intermediate portion in the first direction with respect to the first bent portion exposed from the terminal holding portion, and open toward a side opposite to the intermediate portion in the second direction. For example, after the fastening member accommodating portion and the terminal holding portion are molded with the connector-side terminal portion inserted, the one of the pair of fastening members can be accommodated into the fastening member accommodating portion through an opening on the side opposite to the intermediate portion in the second direction. In this way, a possibility of adversely affect a fastening function of the pair of fastening members by resin having entered between the first bent portion and the one of the pair of fastening members can be reduced as compared to the case where the fastening member accommodating portion and the terminal holding portion are molded with the one of the pair of fastening members and the first bent portion of the connector-side terminal portion inserted in an overlapping state.

(8) Preferably, the connector is provided with a shield shell for covering the housing, the shield shell including a shell opening provided to penetrate through a part facing the opening window of the housing in the first direction and a shell lid portion to be detachably attached to the shell opening. The shield shell includes the shell opening corresponding to the opening window of the housing in the first direction and the shell lid portion to be detachably attached to the shell opening. Therefore, even if the shield shell is provided, the connector-side terminal portion and the device-side terminal portion can be timely fastened by the fastening members from outside.

<Details of Embodiment of Present Disclosure>

A specific example of a connector of the present disclosure is described below with reference to the drawings. Note that the present disclosure is not limited to these illustrations, but is represented by claims and intended to include all changes in the scope of claims and in the meaning and scope of equivalents.

<Embodiment>

Hereinafter, a connector 10 of one embodiment of the present disclosure is described using FIGS. 1 to 11. The connector 10 is mounted on a mounting portion 11 of a device such as an inverter, and connector-side terminal portions 28 to be described later are electrically connected to device-side terminal portions 14 in a terminal block 12 provided on the device. An insertion hole 15 for fastening to the connector-side terminal portion 28 to be described later is formed in a tip part of the device terminal portion 14. Note that the connector 10 can be arranged in an arbitrary direction, but an upper side is an upper side in FIG. 2, a lower side is a lower side in FIG. 2, a left side is a left side in FIG. 2, a right side is a right side in FIG. 2, a front side is a left side in FIG. 3 and a rear side is a right side in FIG. 3 in the following description. Further, in the following description, a vertical direction may be referred to as a first direction and a front-rear direction, which is a direction orthogonal to the first direction, may be referred to as a second direction. Further, for a plurality of identical members, only some members may be denoted by a reference sign and the other members may not be denoted by the reference sign.

The structure of the device such as an inverter including the device-side terminal portions 14 is not limited but, in this embodiment, a tubular mounting hole 18 projecting outward is provided on the mounting portion 11 of the device. This mounting hole 18 has a substantially elliptical outer shape corresponding to a terminal inserting portion 48 to be described later. An inner hole 20 is formed to penetrate through the mounting hole 18 in the front-rear direction, and the device-side terminal portions 14 project toward the outside of the device (right side in FIG. 3) from the inside of the device (left side in FIG. 3) through this inner hole 20. Particularly, in this embodiment, a pair of the device-side terminal portions 14, 14 are provided and separated from and facing each other in a lateral direction. These device-side terminal portions 14, 14 are respectively held by the terminal block 12 mounted on the device. A pair of leg portions 22, 22 project from the mounting portion 11 toward the outside of the device, and bolt insertion holes 24 are formed on the projecting tips of the respective leg portions 22. Note that, in FIGS. 1 to 6, the mounting portion 11 of the device is roughly shown to have a flat plate shape.

<Connector 10>

The connector 10 includes the connector-side terminal portions 28 connected to ends of wires 26 and a housing 30 for accommodating the connector-side terminal portions 28. In this embodiment, a pair of the wires 26, 26 extending in the vertical direction are provided apart from each other in the lateral direction, and the connector-side terminal portions 28 are respectively connected to the ends of the respective wires 26. Each wire 26 is a coated wire, and a core wire 32 is covered by an insulation coating 34. The insulation coating 34 is stripped to expose the core wire 32 on an end part of each wire 26, and the connector-side terminal portion 28 is electrically connected to the end part of each wire 26 by fixing the exposed core wire 32 to one end part (lower end part) of the connector-side terminal portion 28 by a means such as crimping. Note that the means for fixing the end of each wire 26 and the connector-side terminal portion 28 is not limited and, in FIGS. 5 and 6, the end of each wire 26 and the connector-side terminal portion 28 are merely shown to be adjacent.

<Connector-Side Terminal Portions 28>

Each connector-side terminal portion 28 is, for example, formed by a busbar or the like made of electrically conductive metal, and formed by bending a metal plate having a substantially constant width (lateral dimension) into a predetermined shape. Each connector-side terminal portion 28 includes a wire connecting portion 36 connected to the wire 26, an intermediate portion 38 extending in the vertical direction, which is the first direction, from the wire connecting portion 36, and a first bent portion 40 bent in the front-rear direction, which is the second direction, from the tip of the intermediate portion 38. In this embodiment, the intermediate portion 38 extends upward with respect to the wire connecting portion 36 having a predetermined vertical dimension, and the first bent portion 40 projects forward from the upper end, which is a tip, of the intermediate portion 38.

An insertion hole 41 for fastening to the device-side terminal portion 14 is formed to penetrate through a central part of the first bent portion 40 in a plate thickness direction (vertical direction). Further, a through hole 42 is formed to penetrate through an intermediate part in the vertical direction of the intermediate portion 38 in a plate thickness direction (front-rear direction). In this way, a resin material for constituting a terminal holding portion 46 can flow from one side to the other side across the intermediate portion 38 through the through hole 42 when the terminal holding portion 46 to be described later is molded.

Figure 5:
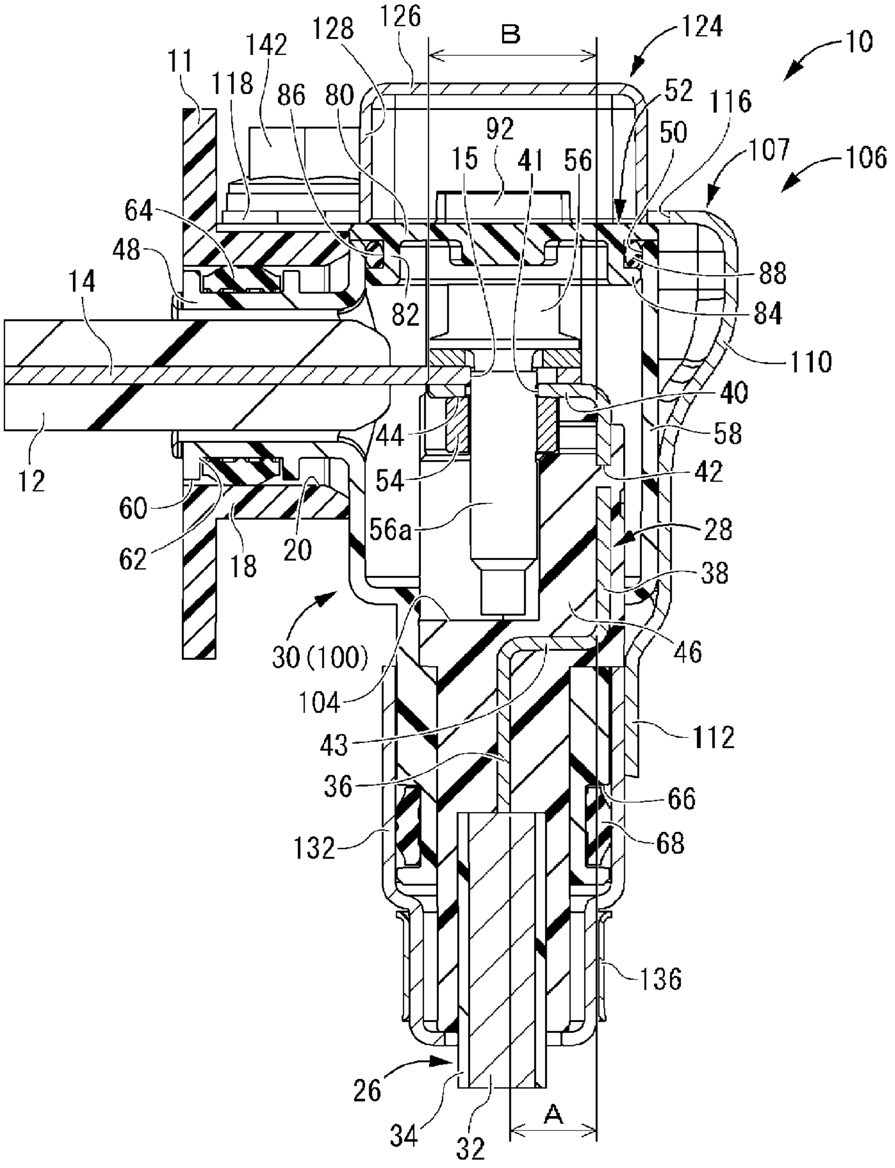
FIG. 5 is a section along V-V in FIG. 2.
Figure 6:
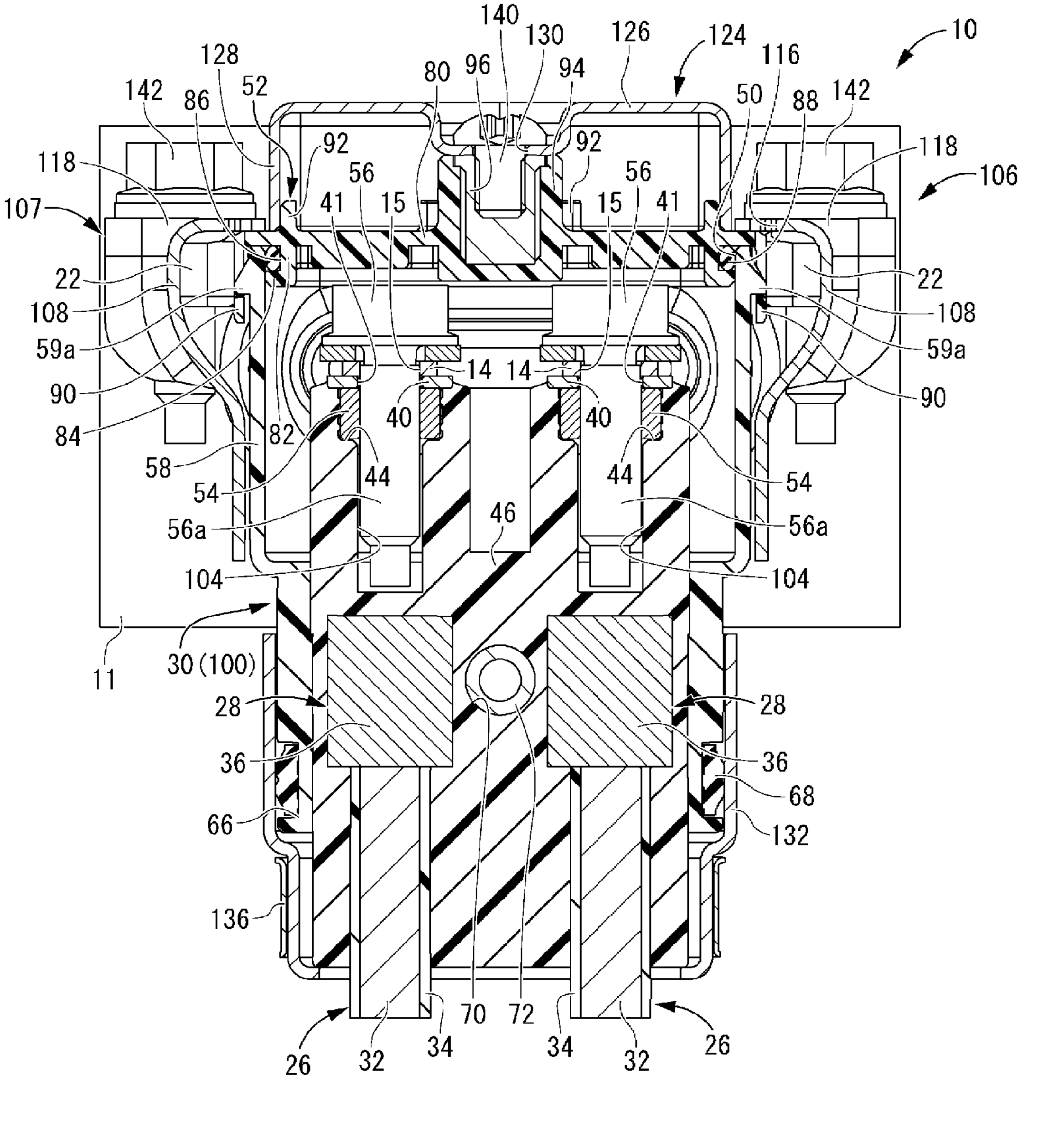
FIG. 6 is a section along VI-VI in FIG. 3.

Further, each connector-side terminal portion 28 includes a second bent portion 43 located between the wire connecting portion 36 and the intermediate portion 38 and bent in the second direction from the lower end, which is a base end, of the intermediate portion 38. The second bent portion 43 extends from the intermediate portion 38 forward toward the same side as the first bent portion 40. The second bent portion 43 is connected to the wire connecting portion 36 at a front end, which is a projecting tip. Each of the first and second bent portions 40, 43 has a predetermined dimension in the front-rear direction. In this embodiment, as shown in FIG. 5, a projecting dimension A of the second bent portion 43 from the intermediate portion 38 is smaller than a projecting dimension B of the first bent portion 40 from the intermediate portion 38.

<Housing 30>

First, the structure of the housing 30 is briefly described. The housing 30 is provided with fastening member accommodating portions 44 each for accommodating one of a pair of fastening members for fastening the connector-side terminal portion 28 and the device-side terminal portion 14 and the terminal holding portion 46 for holding the connector-side terminal portions 28 overlapped on the fastening member accommodating portions 44 in the first direction (vertical direction). Further, the housing 30 is provided with the terminal inserting portion 48 facing the terminal holding portion 46 and allowing the device-side terminal portions 14 to be inserted so that the device-side terminal portions 14 can be overlapped on the connector-side terminals 28 in the first direction (vertical direction). Furthermore, the housing 30 is provided with an opening window 50 arranged to face the connector-side terminal portions 28 in the first direction (vertical direction), exposing the connector-side terminal portions 28 to outside and enabling the other of each pair of fastening members to be inserted therethrough, and a cover portion 52 for covering the opening window 50.

In this embodiment, the pair of fastening members is a nut 54 and a bolt 56. The nut 54, which is the one of the pair of fastening members, is accommodated into the fastening member accommodating portion 44, and the bolt 56, which is the other of the pair of fastening members, is insertable through the opening window 50.

Figure 7:
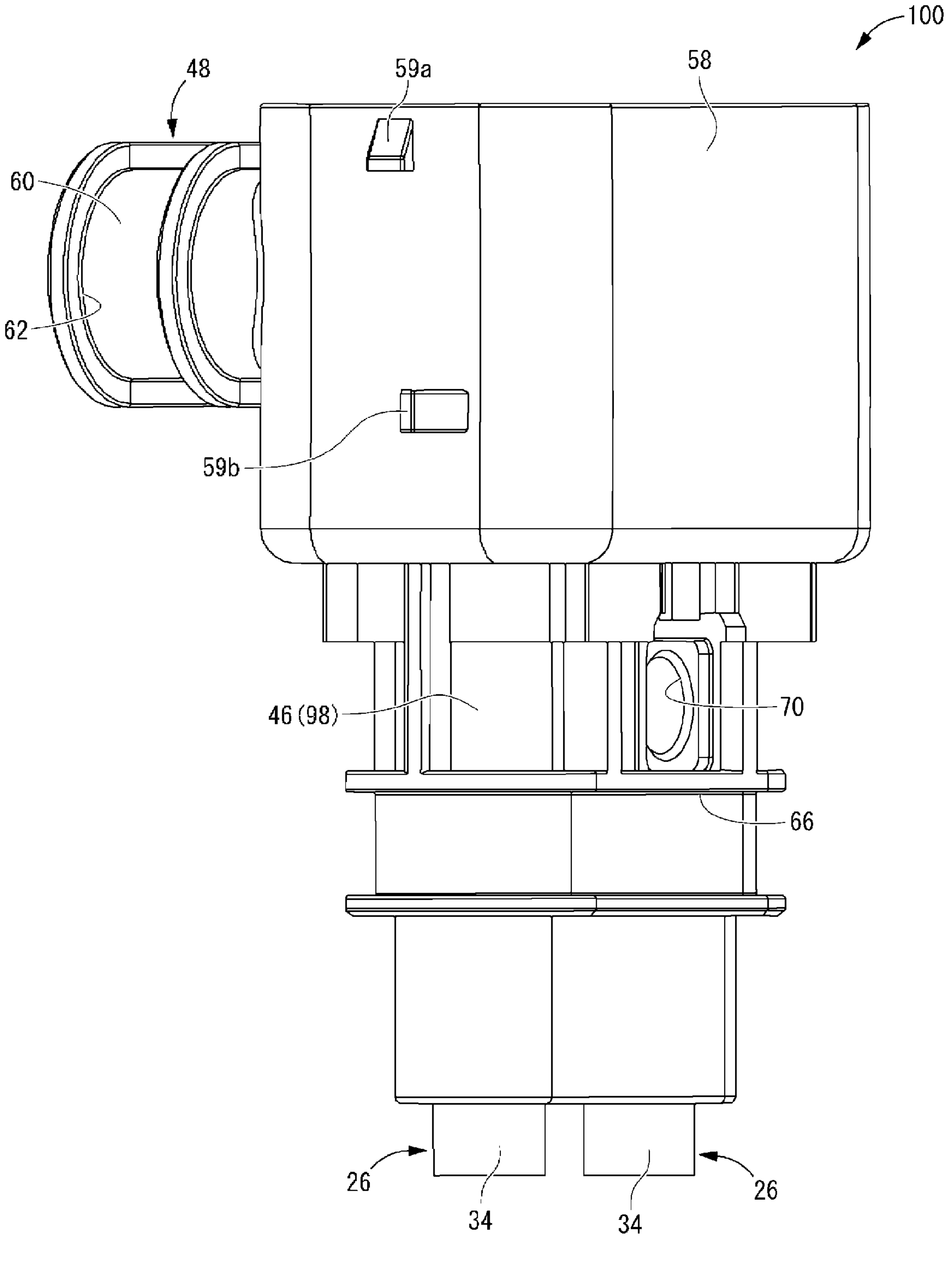
FIG. 7 is a perspective view showing a secondary molded article constituting the connector shown in FIG. 1.
Figure 8:
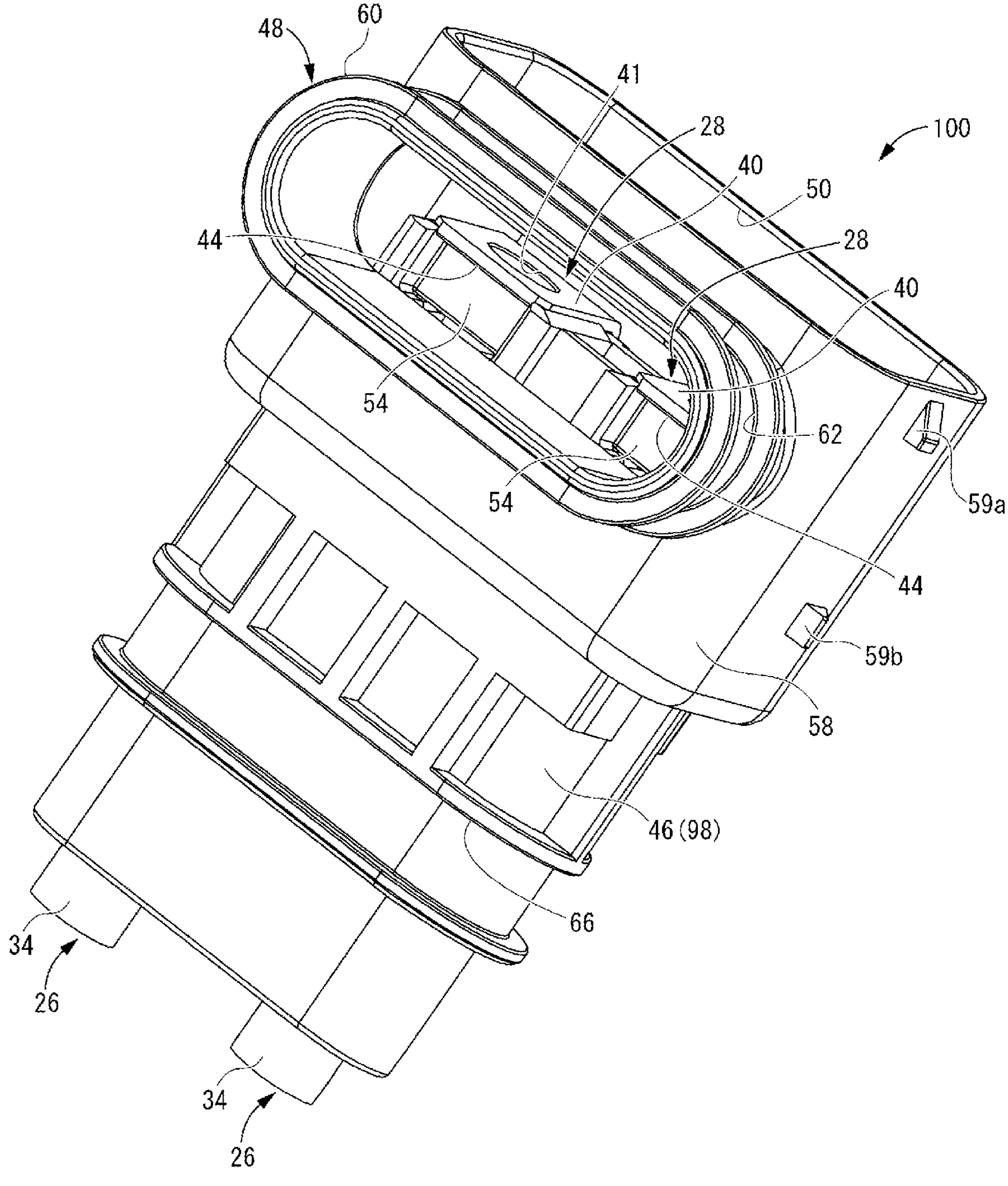
FIG. 8 is a perspective view of the secondary molded article shown in FIG. 7 from another angle.
Figure 9:
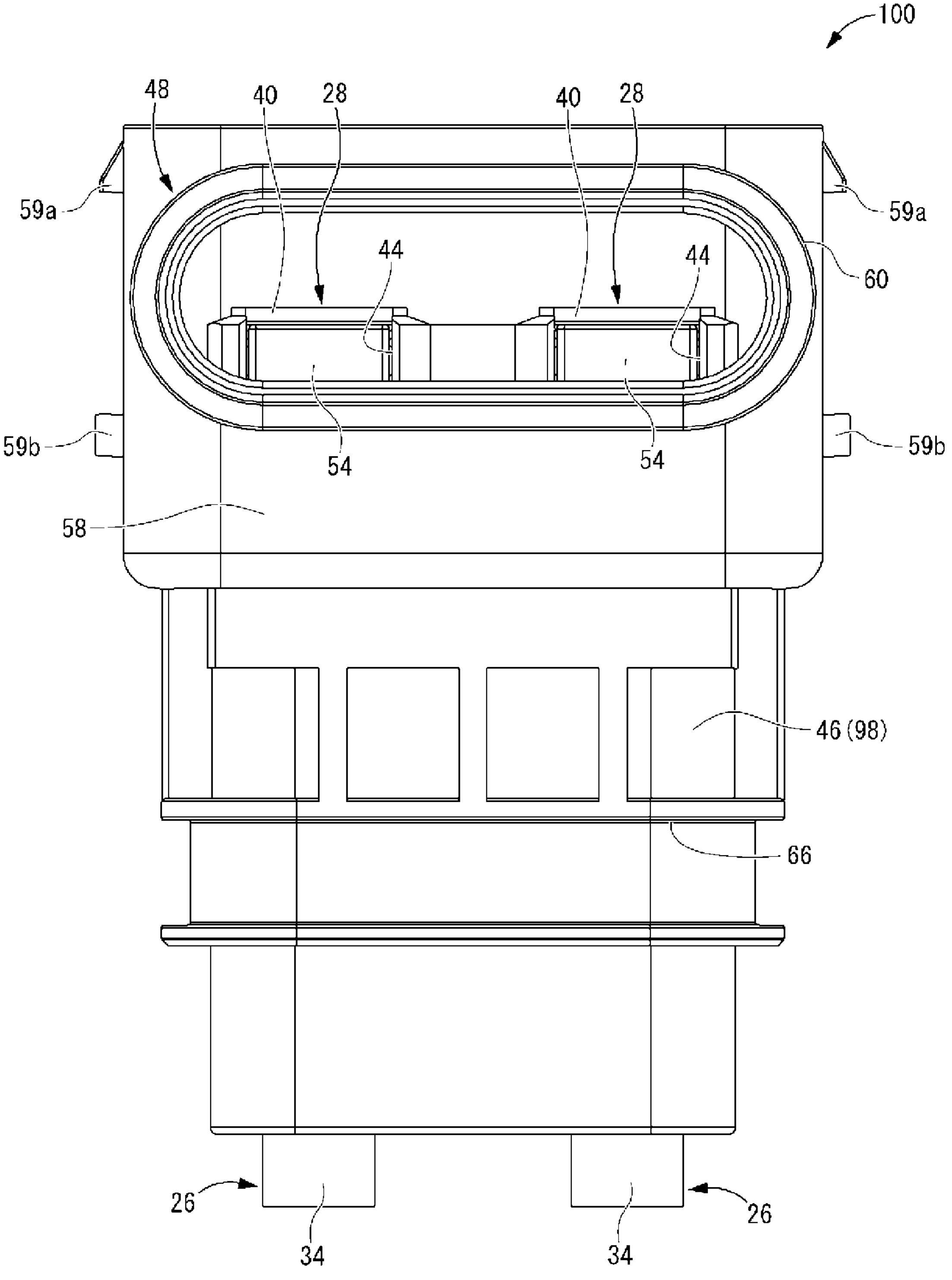
FIG. 9 is a front view of the secondary molded article shown in FIG. 7.

The housing 30 is formed of synthetic resin as a whole. The housing 30 has a hollow shape including an internal space and includes a hollow case portion 58 as also shown in FIGS. 7 to 9. An upper surface, which is a first surface, of the hollow case portion 58, is substantially entirely open to form the aforementioned opening window 50. On an opening peripheral edge part of the opening window 50, cover portion engaging protrusions 59*a* projecting outward in the lateral direction are provided on both sides in the lateral direction on the outer peripheral surface of the hollow case portion 58. Further, shell engaging protrusions 59*b* projecting outward in the lateral direction are provided on both sides in the lateral direction on the outer peripheral surface in a lower part of the hollow case portion 58.

The aforementioned terminal inserting portion 48 projecting forward is formed on a front surface, which is a second surface, of the hollow case portion 58. The terminal inserting portion 48 is in the form of a tube having a tubular outer surface 60, and has an elliptical shape substantially corresponding to the mounting hole 18 of the mounting portion 11. In this embodiment, the tubular outer surface 60 is provided substantially over an entire length in a length direction (front-rear direction) of the terminal inserting portion 48. A recessed groove 62 open toward an outer peripheral side is formed over an entire circumference in a circumferential direction on the tubular outer surface 60 of the terminal inserting portion 48. An annular sealing member 64 made of an elastic material such as rubber is mounted into this recessed groove 62. When the connector 10 is mounted on the mounting portion 11 of the device as described later, the terminal inserting portion 48 having the tubular outer surface 60 is inserted into the mounting hole 18. In this way, the sealing member 64 is sandwiched in a compressed state between the inner peripheral surface of the mounting hole 18 and the tubular outer surface 60 of the terminal inserting portion 48, and a gap between the mounting hole 18 and the terminal inserting portion 48 is sealed in a liquid-tight manner.

A lower side of the internal space of the hollow case portion 58 is closed by the terminal holding portion 46 holding the wires 26 and the connector-side terminal portions 28 connected to the wires 26. Sides of the wires 26 opposite to the sides connected to the connector-side terminal portions 28 project and extend from a lower end part of the terminal holding portion 46. A recessed groove 66 open toward the outer peripheral side over an entire circumference in the circumferential direction is formed in the outer peripheral surface of a part (terminal holding portion 46) holding these wires 26 and connector-side terminal portions 28 in the housing 30. An annular sealing member 68 made of an elastic material such as rubber is mounted into this recessed groove 66. When a wire-side fixing portion 132 in a later-described shield shell 106 having a substantially tubular shape is externally mounted on a lower end part of the housing 30 as described later, the sealing member 68 is compressed to seal a gap between the housing 30 and the wire-side fixing portion 132 in a liquid-tight manner.

Further, a substantially circular accommodation recess 70 is provided in the rear surface of a lower part of the housing 30. A nut 72 is accommodated in the accommodation recess 70 and fixed if necessary.

<Cover Portion 52>

In the housing 30, the cover portion 52 for covering the opening window 50 serving as the upper opening of the internal space includes a base plate portion 80 substantially in the form of a rectangular plate extending in a direction orthogonal to the vertical direction. A peripheral wall 82 projecting downward over an entire circumference in the circumferential direction is provided on an outer peripheral part of the base plate portion 80, and an outer peripheral protrusion 84 projecting toward the outer peripheral side over an entire circumference in the circumferential direction is provided on a lower end part of the peripheral wall 82. In this way, a peripheral groove 86 open toward the outer peripheral side over an entire circumference in the circumferential direction is formed in a vertical gap between the outer peripheral end part of the base plate portion 80 and the outer peripheral protrusion 84. An annular O-ring 88 made of an elastic material such as rubber is mounted into this peripheral groove 86. Further, engaging frame bodies 90 projecting downward are provided on both sides in the lateral direction of the outer peripheral part of the base plate portion 80. Furthermore, positioning protrusions 92 projecting upward while each having a predetermined length are provided on both sides in the lateral direction and on both sides in the front-rear direction on the upper surface of the base plate portion 80.

A substantially tubular accommodating tube portion 94 is provided to project upward in a central part of the base plate portion 80. A nut 96 is accommodated in the accommodating tube portion 94 and fixed if necessary.

Figure 10:
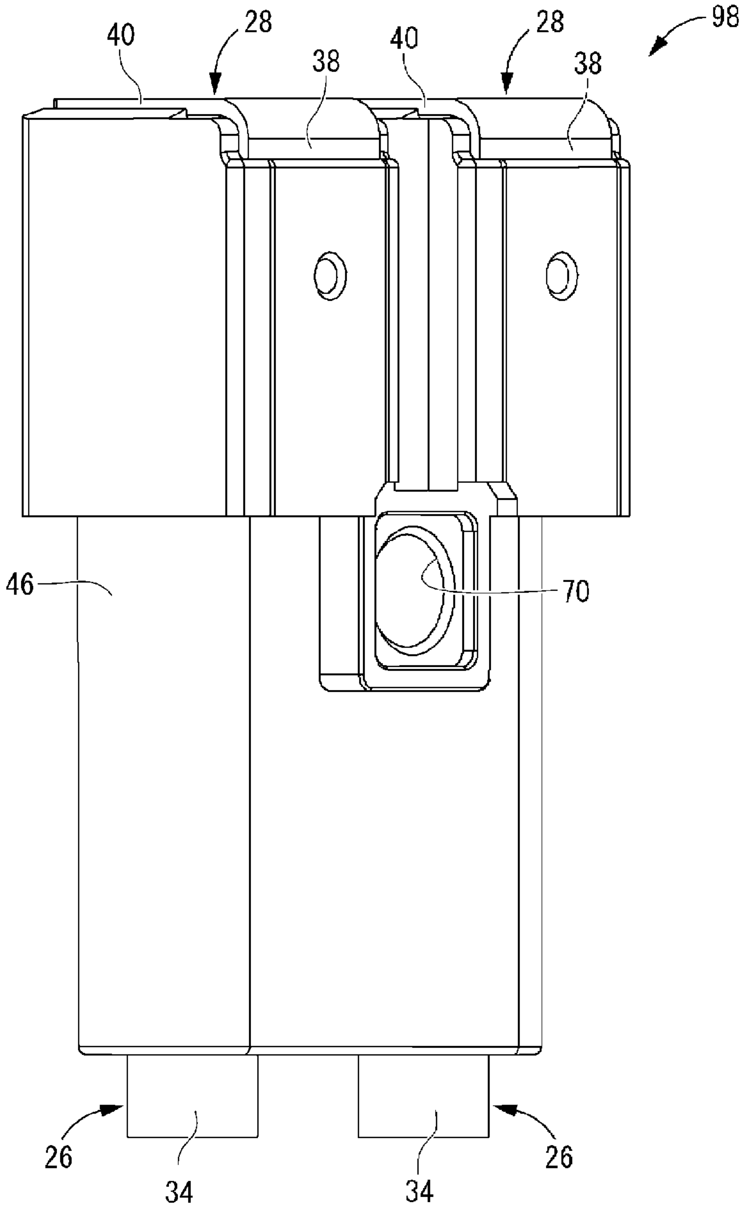
FIG. 10 is a perspective view showing a primary molded article constituting the secondary molded article shown in FIG. 7.
Figure 11:
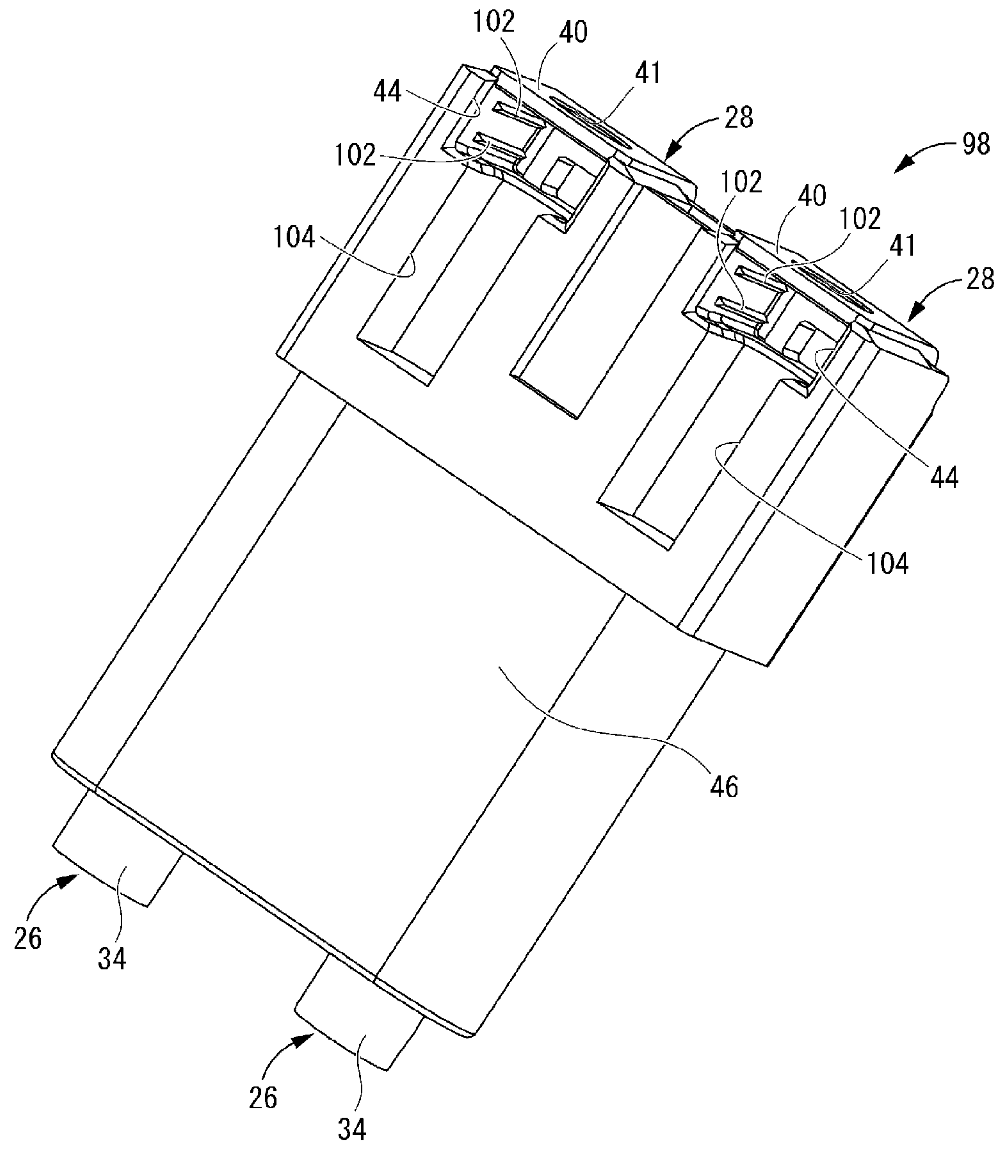
FIG. 11 is a perspective view showing the primary molded article shown in FIG. 10 from another angle.

A manufacturing method of such a housing 30 is not limited but, in this embodiment, a primary molded article 98 shown in FIGS. 10 and 11 is first formed. Thereafter, a secondary molded article 100 shown in FIGS. 7 to 9 is formed and the opening window 50 on an upper side of the secondary molded article 100 is covered by the cover portion 52, whereby the housing 30 is formed. The structures of the primary molded article 98 and the secondary molded article 100 constituting the housing 30 are described in detail below.

<Primary Molded Article 98>

The primary molded article 98 shown in FIGS. 10 and 11 is formed as an integrally molded article provided with the respective wires 26 and connector-side terminal portions 28 by filling and molding a resin material with the respective wires 26 and the connector-side terminal portions 28 connected to the ends of the respective wires 26 set (inserted) in a molding cavity. The synthetic resin constituting this primary molded article 98 is the terminal holding portion 46 holding the respective wires 26 and connector-side terminal portions 28.

This terminal holding portion 46 is fixed while covering the end parts of the wires 26 on the sides connected to the connector-side terminal portions 28 and the substantially entire wire connecting portions 36, second bent portions 43 and intermediate portions 38 of the connector-side terminal portions 28. That is, the connector-side terminal portions 28 are embedded in the terminal holding portion 46, and the first bent portions 40 and upper end parts of the intermediate portions 38 in the connector-side terminal portions 28 are exposed on the outer surface of the terminal holding portion 46. Note that the intermediate portions 38 are formed with the through holes 42 penetrating in the plate thickness direction (front-rear direction). In this way, the resin constituting the terminal holding portion 46 can flow between inside and outside across the intermediate portions 38 through the through holes 42 and the connector-side terminal portions 28 are firmly held in the terminal holding portion 46 by the resin in the through holes 42.

This primary molded article 98 is provided with the fastening member accommodating portions 44 each for accommodating the nut 54 serving as one of the pair of fastening members. In this embodiment, the fastening member accommodating portion 44 is so formed that the first bent portion 40 is overlapped thereon in the first direction (vertical direction). Specifically, the fastening member accommodating portion 44 is arranged below the first bent portion 40 on the side of the intermediate portion 38. That is, a pair of recesses open upward and forward and having a substantially rectangular cross-section are provided apart from each other in the lateral direction in an upper end part of the terminal holding portion 46, and upper openings of these recesses are covered by the first bent portions 40 in the respective connector-side terminal portions 28. In this way, a pair of the fastening member accommodating portions 44 open forward are provided apart from each other in the lateral direction. Therefore, each fastening member accommodating portion 44 is open forward toward a side opposite to the intermediate portion 38 in the second direction (front-rear direction) (see FIG. 11).

Note that pressure-contact ribs 102 projecting inward in the lateral direction are provided to extend in the front-rear direction on both side surfaces in the lateral direction of the inner surface of each fastening member accommodating portion 44. In this embodiment, a pair of the pressure-contact ribs 102, 102 are provided apart from each other in the vertical direction on one inner surface in the lateral direction of the fastening member accommodating portion 44 and a total of four pressure-contact ribs 102 are provided in each fastening member accommodating portion 44.

Further, in the terminal holding portion 46 of the primary molded article 98, a pair of accommodation groove portions 104, 104 open forward are formed apart from each other in the lateral direction in a front end surface. Each accommodation groove portion 104 is formed to extend in the vertical direction, and an upper end part thereof is open to and communicates with the lower end of the fastening member accommodating portion 44. Each accommodation groove portion 104 has predetermined width (dimension in the lateral direction) and depth (dimension in the front-rear direction). Specifically, the width of each accommodation groove portion 104 is slightly larger than an outer diameter of a shaft portion **56*a* of the bolt 56, and the depth of each accommodation groove portion 104 is so set that the accommodation groove portion 104 overlaps the insertion hole 41 in the first bent portion 40** in vertical projection.

The nut 54, which is the one of the pair of fastening members, is press-fit and accommodated from front into each fastening member accommodating portion 44 in the above primary molded article 98. At that time, the projecting tips of the pressure-contact ribs 102 in each fastening member accommodating portion 44 are slightly squeezed by outer surfaces in the lateral direction of the nut 54, whereby the rattling of the nut 54 in each fastening member accommodating portion 44 is prevented. With the nut 54 accommodated in each fastening member accommodating portion 44, the first bent portion 40 in the connector-side terminal portion 28 and the nut 54 are facing each other across a small gap in the vertical direction.

<Secondary Molded Article 100>

The secondary molded article 100 shown in FIGS. 7 to 9 is formed as an integrally molded article provided with the primary molded article 98 and the respective nuts 54 by filling and molding a resin material with the primary molded article 98 assembled with the respective nuts 54 set (inserted) in a molding cavity for the secondary molded article 100. In the secondary molded article 100, the hollow case portion 58 for covering the first bent portions 40 and the upper end parts of the intermediate portions 38 in the connector-side terminal portions 28 exposed on the outer surface of the terminal holding portion 46 from outside is provided and integrated with the terminal holding portion 46 (see FIG. 5). Note that the synthetic resin constituting the terminal holding portion 46 and that constituting the hollow case portion 58 may be the same or may be different. The synthetic resin constituting the terminal holding portion 46 and that constituting the hollow case portion 58 can be properly selected according to required characteristics and the like.

The upper end of the hollow case portion 58 in this secondary molded article 100 is located above the upper end of the primary molded article 98, and the opening window 50, which is the upper opening of the hollow case portion 58, is facing the first bent portions 40 on the upper end of the primary molded article 98 in the vertical direction. In other words, the first bent portions 40 in the connector-side terminal portions 28 are exposed to outside through the opening window 50. Further, the terminal inserting portion 48 projecting forward from the front surface of the hollow case portion 58 is located in front of the first bent portions 40, and facing the first bent portions 40 from the side opposite to the intermediate portions 38 in the second direction (front-rear direction). Therefore, the first bent portions 40 in the connector-side terminal portions 28 are exposed to outside through the terminal inserting portion 48.

Particularly, in this embodiment, the nuts 54 to be overlapped below the first bent portions 40 are partially exposed to outside through the terminal inserting portion 48. In short, the lower ends of the nuts 54 are located below the lower inner surface of the terminal inserting portion 48. Further, the hollow case portion 58 partially covers a lower part of the primary molded article 98 (terminal holding portion 46), and the recessed groove 66 for accommodating the sealing member 68 is formed in the lower end of the hollow case portion 58.

The cover portion 52 is attached to the opening window 52 of the secondary molded article 100 formed in this way. That is, the outer peripheral end part of the base plate portion 80 of the cover portion 52 is overlapped on the opening peripheral edge part of the opening window 50 in the vertical direction, and the cover portion engaging protrusions 59*a* are locked to the engaging frame bodies 90. In this way, the opening window 50 is covered by the cover portion 52 and the housing 30 is configured. By attaching the cover portion 52 to the opening window 50, the O-ring 88 provided in the cover portion 52 is compressed in a radial direction between the peripheral wall 82 and the upper end part of the hollow case portion 58, thereby sealing a gap between the secondary molded article 100 and the cover portion 52 in a liquid-tight manner.

<Shield Shell 106>

As shown in FIGS. 1 to 6, the connector 10 is provided with the shield shell 106 for covering the housing 30. The shield shell 106 is formed of electrically conductive metal. Specifically, the shield shell 106 includes a case-side fixing portion 107 for covering the hollow case portion 58 having an internal space in the housing 30 from behind. The case-side fixing portion 107 is provided with a pair of side wall portions 108, 108 separated from and facing each in the lateral direction and a coupling wall portion 110 coupling rear sides of this pair of side wall portions 108, 108 to each other. A connecting portion 112 projecting downward is formed on the lower end of the coupling wall portion 110, and a bolt insertion hole 114 penetrating in a plate thickness direction (front-rear direction) is provided in a central part of the connecting portion 112. A shell opening 116 vertically penetrating through a part facing the opening window 50 of the housing 30 in the first direction (vertical direction) is formed in an upper part of the case-side fixing portion 107. In this embodiment, the shell opening 116 penetrating in the vertical direction is provided substantially in the entire upper wall of the case-side fixing portion 107.

A mounting piece 118 projecting forward is provided on an upper end part of each side wall portion 108. A bolt insertion hole 120 penetrating in the vertical direction is formed on a projecting tip part (front end part) of the mounting piece 118. An engaging hole 122 penetrating in a plate thickness direction (lateral direction) is formed in a lower part of each side wall portion 108. Note that an intermediate part in the front-rear direction of the shell opening 116 has a large opening width (width in the lateral direction). Therefore, even with the case-side fixing portion 107 fixed to the secondary molded article 100 as described later, the cover portion 52 can be attached to the opening window 50 of the secondary molded article 100 through the shell opening 116.

The shield shell 106 includes a shell lid portion 124 to be detachably attached to the shell opening 116. The shell lid portion 124 has a substantially box shape open downward and includes a substantially rectangular upper bottom wall portion 126 and a peripheral wall portion 128 projecting downward from an outer peripheral edge part of the upper bottom wall portion 126. A bolt insertion hole 130 penetrating in the vertical direction is formed in a central part of the upper bottom wall portion 126.

Further, the shield shell 106 includes a substantially tubular wire-side fixing portion 132 to be externally mounted on a lower part (part for holding the wires 26 and the connector-side terminal portions 28, i.e. the terminal holding portion 46) of the housing 30. The respective wires 26 projecting downward from the terminal holding portion 46 project further downward than the wire-side fixing portion 132 through a lower opening of the wire-side fixing portion 132. A bolt insertion hole 134 penetrating in a plate thickness direction (front-rear direction) is formed in a rear part of the wire-side fixing portion 132.

Further, a lower part of the wire-side fixing portion 132 has a smaller diameter than an upper part, and a crimp band 136 made of metal is externally mounted on this small-diameter part. That is, an unillustrated braided body made of metal thin wires is, for example, externally fit to the lower part of the wire-side fixing portion 132 and the crimp band 136 is mounted from the outside of the braided body to fix the braided body to the wire-side fixing portion 132. In this way, the respective wires 26 projecting downward from the wire-side fixing portion 132 can be covered by the braided body and electromagnetically shielded by grounding the braided body.

<Assembling of Connector 10 and Mounting of Connector 10 on Mounting Portion 11>

An assembling method of the connector 10 and a method for mounting the connector 10 on the mounting portion 11 of the device are described below. Note that the assembling method of the connector 10 and the method for mounting the connector 10 on the mounting portion 11 described below are merely illustrative and not restrictive.

First, the secondary molded article 100 is prepared and the sealing members 64, 68 are mounted into the respective recessed grooves 62, 66. The terminal inserting portion 48 of this secondary molded article 100 is inserted into the mounting hole 18 on the mounting portion 11 of the device as a mating side. In this way, the device-side terminal portions 14 projecting outward from the inside of the device are inserted into an internal space of the secondary molded article 100 through the mounting hole 18 and the terminal inserting portion 48 and overlapped on the first bent portions 40 of the connector-side terminal portions 28 from above. Note that the insertion of the terminal inserting portion 48 into the mounting hole 18 is restrained by the contact of the projecting tip of the mounting hole 18 with the secondary molded article 100 and any further insertion is restricted. With the terminal inserting portion 48 inserted in the mounting hole 18 until the insertion is restricted in this way, the insertion holes 15 in the device-side terminal portions 14 and the insertion holes 41 in the first bent portions 40 are aligned with each other in the first direction (vertical direction).

Subsequently, the respective bolts 56 are inserted through the both insertion holes 15, 41 aligned with each other and tightened into the nuts 54. The shaft portions 56*a* of the bolts 56 passed through the respective nuts 54 are accommodated into the accommodation groove portions 104 located below the nuts 54. In this way, the device-side terminal portions 14 and the connector-side terminal portions 28 are fixed in a state overlapping each other. Thereafter, the cover portion 52 is attached and fixed to the opening window 50 in the secondary molded article 100.

Subsequently, the wire-side fixing portion 132 and the crimp band 136 are externally fit and mounted from below the secondary molded article 100. Further, the case-side fixing portion 107 is brought closer from behind the secondary molded article 100 and the respective shell engaging protrusions 59*b* are engaged with the respective engaging holes 122 of the case-side fixing portion 107. In this way, an inner hole of the nut 72, the bolt insertion hole 134 of the wire-side fixing portion 132 and the bolt insertion hole 114 of the connecting portion 112 are aligned in the front-rear direction. A bolt 138 is inserted through these bolt insertion holes 134, 114 from behind and tightened into the nut 72, whereby the case-side fixing portion 107 and the wire-side fixing portion 132 are fixed to the secondary molded article 100. Further, the shell lid portion 124 is overlapped on the cover portion 52 from above. The respective positioning protrusions 92 of the cover portion 52 come into contact with the peripheral wall portion 128 of the shell lid portion 124 from inside, whereby the cover portion 52 and the shell lid portion 124 are simply positioned. In this way, an inner hole of the nut 96 of the cover portion 52 and the bolt insertion hole 130 of the shell lid portion 124 are aligned in the vertical direction and a bolt 140 is inserted and tightened into the nut 96 from above, whereby the shell lid portion 124 is fixed to the cover portion 52. As a result, the connector 10 is completed.

Further, the respective mounting pieces 118 of the case-side fixing portion 107 are overlapped on the respective leg portions 22 on the mounting portion 11 from above, and the both bolt insertion holes 24, 120 are aligned with each other. Then, bolts 142 are inserted through these bolt insertion holes 24, 120 and tightened. In this way, the connector 10 is mounted on the mounting portion 11 of the device.

Note that an assembling order and the like of the case-side fixing portion 107, the wire-side fixing portion 132, the cover portion 52 and the shell lid portion 124 with the secondary molded article 100 are not limited. The cover portion 52 and the shell lid portion 124 may be assembled after the case-side fixing portion 107 and the wire-side fixing portion 132 are assembled with the secondary molded article 100. Further, in releasing the tightening of the bolts 56 and the nuts 54 at the time of maintenance or the like, the shell lid portion 124 and the cover portion 52 can be removed through the shell opening 116 even with the case-side fixing portion 107 fixed to the secondary molded article 100. In this way, the tightening of the bolts 56 and the nuts 54 can be released through the opening window 50.

According to the connector 10 of this embodiment, the nut 54, which is one of the pair of fastening members, and the bolt 56, which is the other of the pair of fastening members, are both accommodated and arranged inside the housing 30. Since the device-side terminal portion 14 and the connector-side terminal portion 28 are fastened by these bolt 56 and nut 54, the device-side terminal portion 14 and the connector-side terminal portion 28 can be firmly connected. Since the pair of fastening members (bolt 56 and nut 54) are both provided in the connector 10, the structure on the device side can be simplified and the device can be reduced in size, for example, without providing either of the pair of fastening members on the device side. Particularly, the nut 54 is separate from the device-side terminal portion 14 and the connector-side terminal portion 28. Therefore, the bolt 56 and the nut 54 can be tightened with a sufficient tightening length while special processing of the device-side terminal portion 14 and the connector-side terminal portion 28 is avoided.

The connector-side terminal portion 28 includes the first bent portion 40 and the intermediate portion 38 bent with respect to the first bent portion 40, the fastening member accommodating portion 44 is provided in an internal space between these first bent portion 40 and intermediate portion 38 arranged substantially in L shape, and the nut 54 is accommodated therein. Therefore, the nut 54 can be arranged well into the internal space of the connector-side terminal portion 28 and the connector 10 can be reduced in size.

Further, the connector-side terminal portion 28 includes the second bent portion 43, and not only the nut 54, but also the shaft portion 56*a* of the bolt 56 inserted through the nut 54 are accommodated in a region surrounded by the first bent portion 40, the intermediate portion 38 and the second bent portion 43. In this way, the structure can be further simplified and the connector 10 can be further reduced in size. Particularly, the projecting dimension A of the second bent portion 43 from the intermediate portion 38 is set to be smaller than the projecting dimension B of the first bent portion 40 from the intermediate portion 38. In this way, as also shown in FIG. 5, the bolt 56 inserted through the first bent portion 40 and the wire 26 located below the projecting tip of the second bent portion 43 substantially overlap in vertical projection. As a result, the dimension in the front-rear direction (dimension in the lateral direction in FIG. 5) of the connector 10 can be suppressed to be small and the connector 10 can be further reduced in size.

The mounting portion 11 on the device side is provided with the mounting hole 18, and the terminal inserting portion 48 of the connector 10 is inserted into the mounting hole 18 in mounting the connector 10 on the mounting portion 11 on the device side. The sealing member 64 is externally mounted on the terminal inserting portion 48 and compressed at the time of inserting the terminal inserting portion 48 into the mounting hole 18. In this way, waterproofness in a mounted part of the connector 10 and the device is ensured.

In this embodiment, in manufacturing the housing 30, the primary molded article 98 provided with the wires 26 and the connector-side terminal portions 28 is formed, and the secondary molded article 100 is formed after the nuts 54 are mounted into the primary molded article 98. By performing molding separately a plurality of times, the housing 30 having a relatively complicated structure can be easily formed. Particularly, since the terminal holding portion 46 and the hollow case portion 58 are integrated with each other in the secondary molded article 100, water intrusion through a gap between the terminal holding portion 46 and the hollow case portion 58 can be more reliably prevented.

The opening window 50 is provided in the upper surface, which is the first surface, of the hollow case portion 58, and the terminal inserting portion 48 is provided on the front surface, which is the second surface, of the hollow case portion 58. Since the opening window 50 and the terminal inserting portion 46 are respectively provided in/on separate surfaces of the hollow case portion 58 in this way, it is, for example, possible to form the opening window 50 large and the terminal inserting portion 48 small. By forming the large opening window 50, a degree of freedom in selecting the other of the pair of fastening members (bolt 56 in this embodiment) to be inserted through the opening window 50 can be improved. Further, by forming the small terminal inserting portion 48, the rigidity of the terminal inserting portion 48 can be improved and processing cost for forming the hollow case portion 58 with the terminal inserting portion 48 can be suppressed to be small. In addition, since the mounting hole 18 can also be made small, the rigidity of the mounting hole 18 can be improved and processing cost for forming the mounting portion 11 with the mounting hole 18 can also be suppressed to be small.

In the primary molded article 98, the fastening member accommodating portions 44 are open toward the side (forward) opposite to the intermediate portions 38 in the second direction, and the nuts 54 are mounted into the primary molded article 98 from front. In this way, a possibility that the resin enters between the connector-side terminal portions 28 and the nuts 54 is reduced, for example, as compared to the case where molding is performed with the nuts 54 set (inserted) in the molding cavity in addition to the wires 26 and the connector-side terminal portions 28 in molding the primary molded article. As a result, a possibility of adversely affecting the tightening of the bolts 56 and the nuts 54 by the resin having entered between the connector-side terminal portions 28 and the nuts 54 can be reduced, and the bolts 56 and the nuts 54 can be more reliably tightened.

The connector 10 is provided with the shield shell 106 for covering the housing 30. The shield shell 106 is provided with the case-side fixing portion 107 and the wire-side fixing portion 132 to be coupled to each other and, for example, a braided wire made of metal for covering the respective wires 26 from outside can be electrically connected to the wire-side fixing portion 132. In this way, the respective wires 26, the connector-side terminal portions 28 and the like can be electromagnetically shielded by the case-side fixing portion 107, the wire-side fixing portion 132, the braided wire and the like. Further, the shell lid portion 124 is detachably attached to the shell opening 116 of the case-side fixing portion 107. Therefore, even with the case-side fixing portion 107 assembled with the secondary molded article 100, the tightening of the bolts 56 and the nuts 54 can be released by removing the shell lid portion 124 and the cover portion 52.

<Modifications>

Although the embodiment has been described in detail as a specific example of the present disclosure above, the present disclosure is not limited by this specific description. The present disclosure includes modifications, improvements and the like within a range in which the aim of the present disclosure can be accomplished. For example, the following modifications of the embodiment are also included in the technical scope of the present disclosure.

(1) Although the housing 30 is configured by forming the secondary molded article 100 and assembling the cover portion 52 with the secondary molded article 100 after the nuts 54 are mounted into the primary molded article 98 in the above embodiment, there is not limitation to this mode. By forming the terminal inserting portion large, the nuts can be mounted into the fastening member accommodating portions from front through the terminal inserting portion after the molding of the housing. In that case, the terminal holding portion and the hollow case portion may be separately molded as in the above embodiment, but may be integrally molded. By making the terminal inserting portion large and mounting the nuts from front through the terminal inserting portion in this way, the manufacturing of the housing can be facilitated. Alternatively, the terminal holding portion may be molded with not only the wires and the connector-side terminal portions, but also the one (nut 54 in this embodiment) of each pair of fastening members set (inserted) in the molding cavity. Also in this case, the terminal holding portion and the hollow case portion may be formed by being successively molded or by being integrally molded.

(2) Although the bolt 56 and the nut 54 have been illustrated as the pair of fastening members in the above embodiment, there is no limitation to this. Further, even if the bolt and the nut are adopted, there is no limitation to such a mode that the nut is accommodated in the fastening member accommodating portion and the bolt is inserted through the opening window. For example, a head part of the bolt, which is one of the pair of fastening members, is arranged in the fastening member accommodating portion, the shaft portion of the bolt is caused to project upward through an inserting portion provided in the first bent portion of the connector-side terminal portion, and the device-side terminal portion is provided with a recess open outward to enable the insertion of the shaft portion of the bolt on a tip part. By mounting such a connector on the mounting portion of the device, the shaft portion of the bolt projecting upward is inserted into the recess of the device-side terminal portion and the nut, which is the other of the pair of fastening members, is inserted through the opening window and tightened onto the bolt. In this way, the device-side terminal portion and the connector-side terminal portion are overlapped and fastened, whereby effects similar to those of the above embodiment can be exhibited.

LIST OF REFERENCE NUMERALS

10 connector
11 mounting portion
12 terminal block
14 device-side terminal portion
15 insertion hole
18 mounting hole
20 inner hole
22 leg portion
24 bolt insertion hole
26 wire
28 connector-side terminal portion
30 housing
32 core wire
34 insulation coating
36 wire connecting portion
38 intermediate portion
40 first bent portion
41 insertion hole
42 through hole
43 second bent portion
44 fastening member accommodating portion
46 terminal holding portion
48 terminal inserting portion
50 opening window
52 cover portion
54 nut (one of pair of fastening members)
56 bolt (other of pair of fastening members)
**56*a*** shaft portion
58 hollow case portion
**59*a*** cover portion engaging protrusion
**59*b*** shell engaging protrusion
60 tubular outer surface
62 recessed groove
64 sealing member
66 recessed groove
68 sealing member
70 accommodation recess
72 nut
80 base plate portion
82 peripheral wall
84 outer peripheral protrusion
86 peripheral groove
88 O-ring
90 engaging frame body
92 positioning protrusion
94 accommodating tube portion
96 nut
98 primary molded article
100 secondary molded article
102 pressure-contact rib
104 accommodation groove portion
106 shield shell

107 case-side fixing portion
108 side wall portion
110 coupling wall portion
112 connecting portion
114 bolt insertion hole
116 shell opening
118 mounting piece
120 bolt insertion hole
122 engaging hole
124 shell lid portion
126 upper bottom wall portion
128 peripheral wall portion
130 bolt insertion hole
132 wire-side fixing portion
134 bolt insertion hole
136 crimp band
138, 140, 142 bolt

What is claimed is:

1. A connector to be connected to a device-side terminal portion provided in a device, comprising:

a connector-side terminal portion connected to an end of a wire; and a housing for accommodating the connector-side terminal portion, the housing including:

a fastening member accommodating portion for accommodating one of a pair of fastening members for fastening the connector-side terminal portion and the device-side terminal portion;

a terminal holding portion for directly holding the connector-side terminal portion overlapped on the fastening member accommodating portion in a first direction;

a terminal inserting portion facing the terminal holding portion, the device-side terminal portion being inserted through the terminal inserting portion to be overlapped on the connector-side terminal portion in the first direction;

an opening window arranged to face the connector-side terminal portion in the first direction, the connector-side terminal portion being exposed to outside and the other of the pair of fastening members being insertable through the terminal inserting portion; and a cover portion for covering the opening window, wherein the connector-side terminal portion includes a wire connecting portion connected to the wire, an intermediate portion extending in the first direction from the wire connecting portion and a first bent portion bent in a second direction intersecting the first direction from a tip of the intermediate portion, and the first bent portion is overlapped with the fastening member accommodating portion in the first direction, the connector-side terminal portion is embedded in the terminal holding portion and the first bent portion is exposed on an outer surface of the terminal holding portion, and the fastening member accommodating portion is arranged on the side of the intermediate portion in the first direction with respect to the first bent portion exposed from the terminal holding portion.

2. The connector of claim 1, wherein:

the connector-side terminal portion includes a second bent portion located between the wire connecting portion and the intermediate portion and bent in the second direction from a base end of the intermediate portion, and the second bent portion projects from the intermediate portion toward the same side as the first bent portion and a projecting dimension of the second bent portion is smaller than that of the first bent portion.

3. The connector of claim 1, wherein the terminal inserting portion of the housing has a tubular outer surface to be inserted into a tubular mounting hole provided in the device and having the device-side terminal portion arranged therein and an annular sealing member to be sandwiched between the mounting hole and the tubular outer surface is mounted on the tubular outer surface.

4. The connector of claim 1, wherein:

the housing includes a hollow case portion for surrounding the first bent portion exposed on the outer surface of the terminal holding portion from outside, the hollow case portion being integrated with the terminal holding portion.

5. The connector of claim 4, wherein, in the housing, the opening window is provided in a first surface of the hollow case portion facing the first bent portion in the first direction and the terminal inserting portion is provided on a second surface of the hollow case portion facing the first bent portion from a side opposite to the intermediate portion in the second direction.

6. The connector of claim 1, wherein the fastening member accommodating portion is open toward a side opposite to the intermediate portion in the second direction.

7. The connector of claim 1, comprising a shield shell for covering the housing, the shield shell including a shell opening provided to penetrate through a part facing the opening window of the housing in the first direction and a shell lid portion to be detachably attached to the shell opening.

8. The connector of claim 1, wherein an insertion hole for fastening to the device-side terminal portion is formed to penetrate through a central part of the first bent portion in the first direction, and a through hole is formed to penetrate through an intermediate part in a vertical direction of the intermediate portion in the second direction.

9. The connector of claim 1, wherein the one of the pair of fastening members is an external thread, and the other of the pair of fastening members is an internal thread.

* * * * *